INVENTOR
HARRY E. WEAVER
BY
Raymond W. Junkins
ATTORNEY

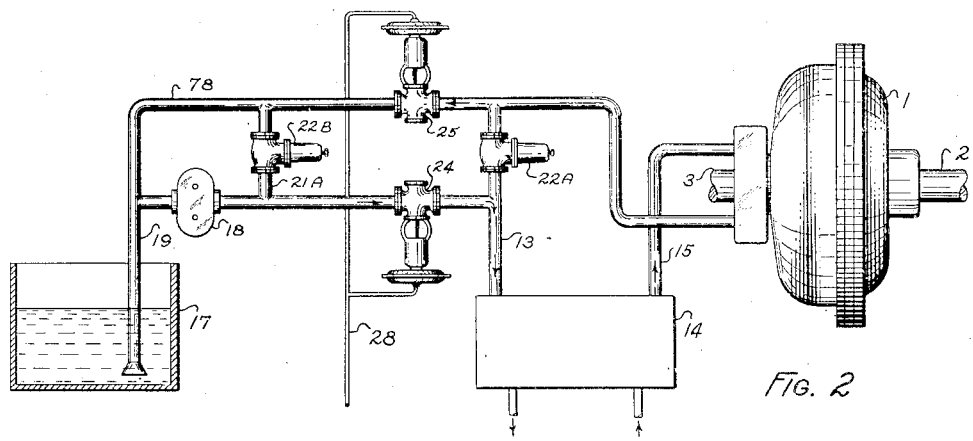
FIG. 2
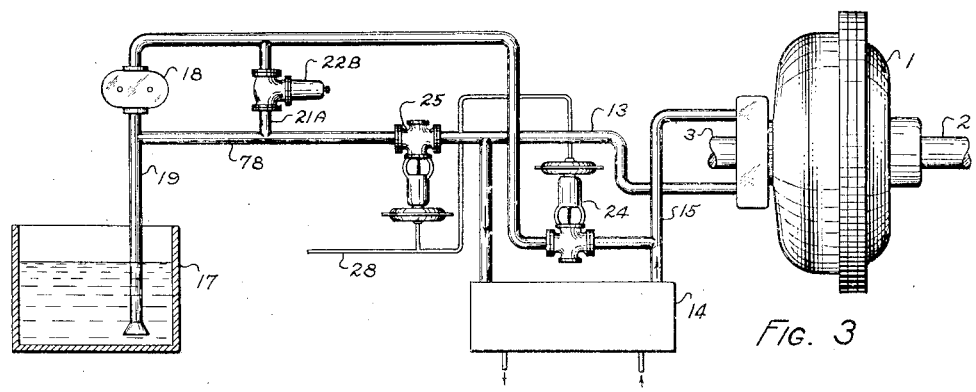
FIG. 3
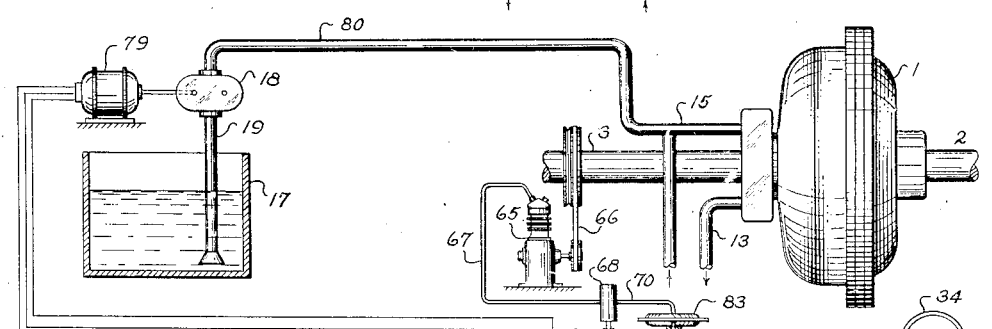
FIG. 4
FIG. 5
FIG. 6
INVENTOR
HARRY E. WEAVER
BY Raymond W. Junkins
ATTORNEY May 10, 1938.  H. E. WEAVER  2,116,992
CONTROL SYSTEM
Filed June 19, 1935   3 Sheets-Sheet 3

Patented May 10, 1938

2,116,992

UNITED STATES PATENT OFFICE 2,116,992

CONTROL SYSTEM

Harry E. Weaver, South Euclid, Ohio, assignor to Bailey Meter Company, a corporation of Delaware Application June 19, 1935, Serial No. 27,425

24 Claims. (Cl. 60—54)

This invention relates to a method of and apparatus for controlling the rate of output of variable ratio fluid transmission mechanisms, such as fluid, or more specifically hydraulic couplings.

Such couplings are interposed between a constant speed source of power, such for example as a synchronous motor, a turbine, or Diesel engine, and a preferably variable output driven device, such for example as a fan, pump, or wheels of a vehicle; and it is specifically an object of my invention to control the speed of the variable speed shaft of the coupling to maintain a desirable rate of output of the driven device.

In some cases the driven device may produce an agent directly or indirectly contributing to the production of or maintenance of a condition, such as temperature, pressure, level, rate of flow or electromotive force. My invention contemplates regulating the rate of production of the agent by control of the coupling to maintain the condition at a desired or predetermined value. For example, it is desirable to vary the rate of supply of the elements of combustion to a vapor generator in accordance with the demand for vapor as indicated by changes in vapor pressure. In accordance with my invention the rate of output of the air and fuel supply means may be varied to maintain a desired vapor pressure by controlling a hydraulic coupling interposed between such means and their driving elements.

It is a further object of my invention to provide a coupling control wherein the actual output speed of the coupling follows promptly and accurately desired changes in the speed without over-travel or hunting.

Further objects will be apparent from the following description and the drawings in which:

Fig. 1 shows diagrammatically a fluid pressure actuated coupling control system.

Figs. 2, 3, and 4 each show diagrammatically a modified form of fluid pressure actuated coupling control.

Figs. 5 and 6 show modified forms of follow-up devices which may be used with the coupling control illustrated in Figs. 1, 2, 3 or 4.

Figures 1, 10:
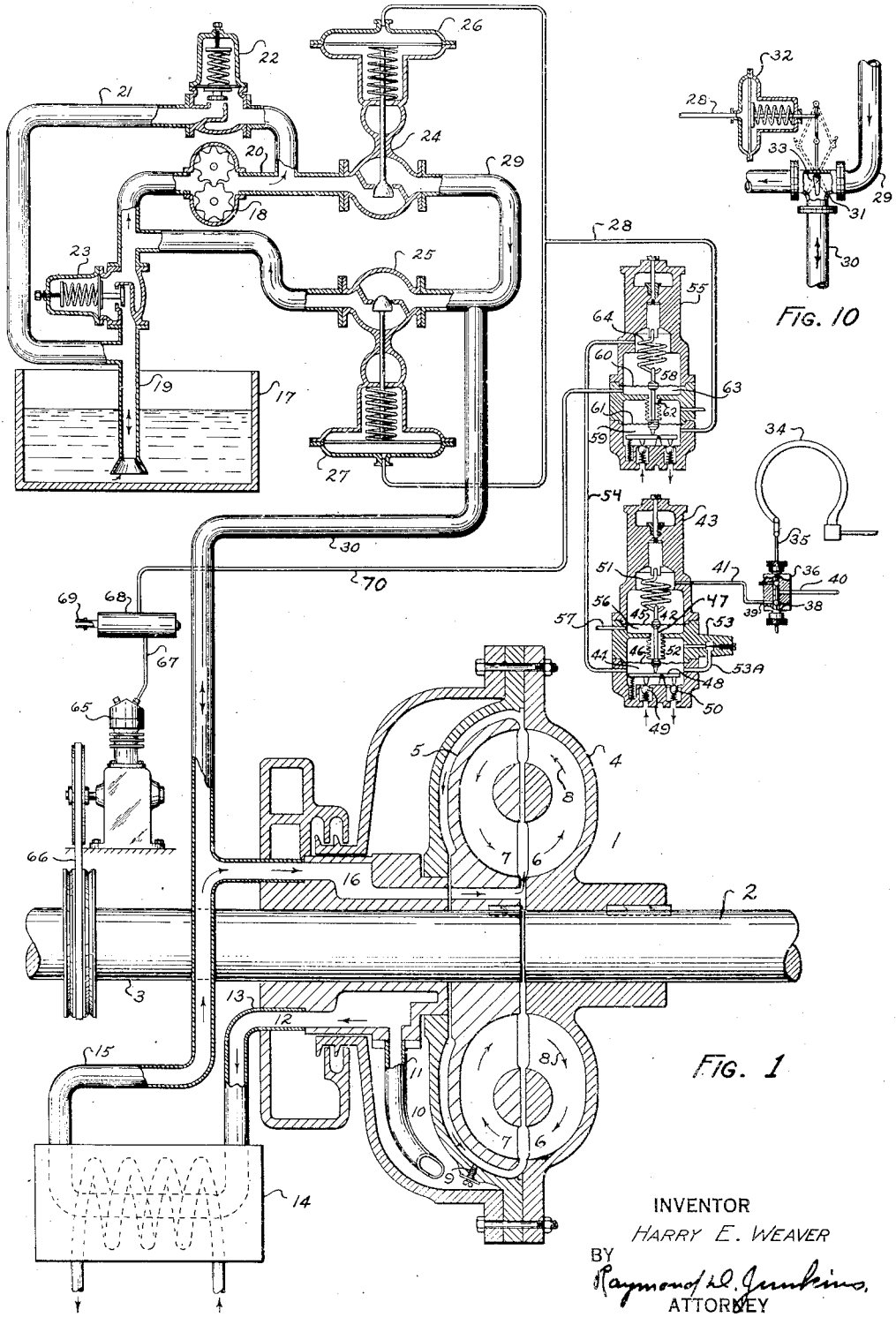
Fig. 10 shows a modified form of flow proportioning valve.

Referring to Fig. 1, I have therein shown in cross section a hydraulic coupling generally indicated at 1 adapted to receive power from an input shaft 2, and to deliver power to a variable speed output shaft 3. The input shaft 2 may be driven from any desired source of power, such as reciprocating engine, electric motor, Diesel engine, steam turbine, or the like. Likewise the variable speed output shaft 3 is adapted to actuate a driven device such as a fan, pump, transmission system, stoker, feeder, or in fact any power utilizing device.

The coupling consists essentially of an impeller 4 and a runner 5 secured to the input shaft 2 and output shaft 3 respectively, and provided with radially spaced blades or vanes 6 and 7. With the passages of the impeller and runner partially or wholly filled with a suitable driving fluid such as oil, rotation of the impeller 4 causes a fluid flow in the direction of the arrows 8, which reacts in its return flow to effect rotation of the runner 5. A spiral or helical path of fluid flow, more or less perfect according to the degree of slippage of the coupling, thus results.

Oil thrown off from the passages of the impeller and runner passes through suitable leak-off nozzles 9 into an outer casing 10, where it is held against the outer periphery by centrifugal force until picked up by a stationary scoop tube 11. To prevent overheating, the oil picked up by the scoop tube 11 may be conducted through an outlet passage 12, through pipe 13, and circulated through a suitable cooler 14, before being returned through pipe 15 to an inlet passage 16. The quantity of oil passing through the leak-off nozzles 9 and picked up by the scoop tube 11 varies with the speed of the runner 5. The pressure of the fluid within the scoop tube and coupling outlet will accordingly bear a functional relation to the speed of the runner 5.

As known, the runner speed may be changed by varying the volume of oil within the coupling. Thus, increases in the volume of oil effect proportionate increases in the runner speed, and when the passages of the coupling are completely filled the runner speed will be slightly less than the impeller speed. Conversely, decreases in the volume of oil in the coupling effect proportionate reductions in runner speed.

A reservoir 17 is provided for excess coupling oil and when it is desired to increase the speed of the output shaft 3 a quantity of oil is transferred from the reservoir 17 to the coupling 1 sufficient to increase the speed the desired amount. Conversely, when it is desired to decrease the speed of the output shaft 3, a quantity of oil, depending upon the decrease in speed desired, is withdrawn from the coupling 1 and returned to the reservoir 17. A feature of my invention resides in the methods and means I employ for automatically regulating the quantity of oil transferred to bring the speed of the output shaft 3 to the desired rate quickly, but without overtravel or hunting.

In the embodiment shown in Fig. 1 a continuously running pump 18, in communication with the interior of the reservoir 17 through a suction tube 19, provides a constant supply of oil under pressure which is circulated from the pump 18 through a discharge pipe 20, by-pass line 21, to the suction tube 19, and returned to the inlet of the pump 18. A constant pressure is maintained at the pump discharge and the pump suction by means of the relief valves 22 and 23 respectively, which may be adjusted to maintain any desired pressures.

For regulating the flow of oil to and from the coupling 1, I provide a branch circuit, through which a continuous flow of oil is maintained, comprising a pair of oppositely acting valves 24 and 25, actuated by diaphragm motors 26 and 27 positioned by variations in fluid pressure established within a pipe 28. When the fluid pressure within the pipe 28 increases, the valve 24 is positioned in an opening direction and the valve 25 is simultaneously positioned in a closing direction.

The outlet of the valve 24 is connected to the inlet of the valve 25 by a pipe 29, which is connected to the inlet 16 of the coupling 1 by a pipe 30. Upon an increase of fluid pressure within the pipe 28, oil admitted to the pipe 29 will increase above that discharged, and accordingly oil will be transmitted to the coupling 1. Conversely, upon a decrease of fluid pressure within the pipe 28, oil will be removed from the pipe 29 more rapidly than admitted, and oil will be withdrawn from the coupling 1. When the quantity of oil in the coupling 1 corresponds to the desired speed of the output shaft 3, the valves 24 and 25 will be in a neutral position, that is, positioned so that the rate at which oil is discharged from the branch circuit through the valve 25 is equal to the rate at which oil is admitted to the branch circuit through the valve 24.

It is characteristic of most fluid couplings of the type described that the pressure at the inlet remains constant regardless of the output speed, and accordingly the pressure in the pipe 29 will remain substantially constant throughout the coupling speed range. By proper adjustment of the relief valves 22 and 23 therefore the pressure drop across the valve 24 may be made equal to or in desired proportion to the pressure drop across valve 25, facilitating the design of the valve to obtain desired flow characteristics.

Figure 11:
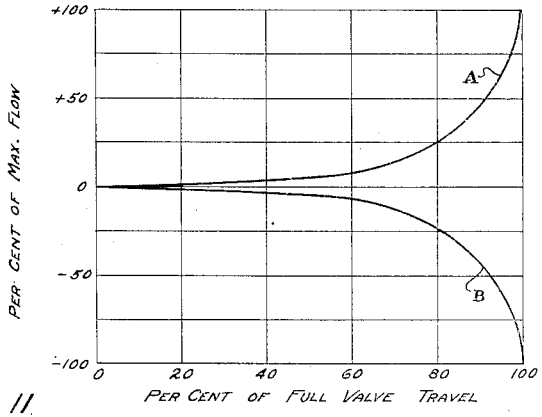
Fig. 11 illustrates graphically desired flow proportioning valve characteristics.

In Fig. 11 I have shown graphically the valve flow characteristics which have been found to be desirable. In the graph negative flows represent flows from the pipe 29 through the valve 25 whereas positive flows represent flows to the pipe 29 through the valve 24. With the correct quantity of oil in the coupling and the system in equilibrium, the valves 24 and 25 are at approximately fifty percent of full travel, and the quantity of oil admitted to the pipe 29 is equal to that removed, as shown by curves A and B. If now it is desired to increase the speed of the output shaft, the inlet valve 24 is positioned in an opening direction, the flow increasing as shown. Simultaneously the valve 25 is positioned in a closing direction, the flow decreasing as shown. The difference between the two flows is that transmitted to the coupling and controls the rate of speed increase. It is to be noted that the rate of oil change varies as the amount the actual speed of the coupling is from the desired, and by proper design of the flow passages of the valves 24 and 25, I can obtain any desired valve travel vs. flow characteristic. Furthermore, as the output shaft speed approaches that desired, the rate at which oil is transferred to or from the coupling 1 becomes increasingly smaller, so that there is no tendency to over-travel or hunt.

As an alternate arrangement the valves 24 and 25 may be adjusted so that both are in the closed position when the value of the fluid pressure in the pipe 28 indicates that the speed of the output shaft 3 is at the desired value. As the fluid pressure in the pipe 28 increases the valve 24 will be positioned in an opening direction admitting oil to the pipe 30, whereas the valve 25 will remain closed. Conversely, when the fluid pressure in the pipe 28 decreases below that corresponding to the closed position of both valves the valve 25 will be positioned in an opening direction, withdrawing oil from the pipe 30, whereas the valve 24 will remain in the closed position.

In some cases I may desire to dispense with the oppositely acting valves 24 and 25, and substitute a single flow proportioning valve 31, actuated by diaphragm motor 32, as shown in Fig. 10. In this modified form as the fluid pressure in the pipe 28 increases, valve member 33 is moved further to the left as viewed in the drawings, and accordingly the flow transmitted to the coupling 1 through the pipe 30 increases above that withdrawn. Upon a decrease in fluid pressure within the pipe 28 the valve member 33 is positioned to the right, and oil is accordingly withdrawn from the coupling 1. While in the opposed valve construction shown in Fig. 1 and in the modified construction shown in Fig. 10, oil is withdrawn from the coupling 1, upon a decrease in fluid pressure within the pipe 28; and transmitted to the coupling 1 upon an increase in fluid pressure, I may by proper modification arrange to have oil withdrawn from the coupling 1 upon an increase in fluid pressure within the conduit 28, and transmitted thereto upon a decrease, as will be readily understood by those familiar with the art.

In Fig. 1 I have shown my control system adapted to control the output shaft speed in accordance with the magnitude of a condition which may be partially or wholly maintained by a power utilizing device driven by the output shaft. If, for example, the fan supplying air to the combustion chamber of a steam generator is driven by the output shaft 3, then, in accordance with my invention the speed of the output shaft 3 may be controlled to vary the rate of air supply in accordance with vapor pressure. However, this is merely an example, and is in no wise a limitation, for my invention may as well be put to any other of a wide variety of uses. In general the control system shown acts to produce an immediate change in the output of the power utilizing device in accordance with changes in the controlled condition and thereafter to produce a continuing change until the controlled condition is restored to the desired value.

Adapted to be positioned by the controlled condition is a sensitive device, such as a Bourdon tube 34, from which depends a movable valve member 35 of a pilot valve generally indicated at 36, which may be of the type forming the subject matter of an application to Clarence Johnson, Serial Number 673,*** filed in the United States Patent Office May 27th, 1933, now Patent No. 2,054,464. The movable valve member 35 is provided with lands 38 of slightly less diameter than the passageway extending longitudinally through the valve 36, and opening to the atmosphere at either end. Pressure fluid, such as compressed air, admitted through an inlet port 40 flows through the passageway producing a pressure gradient across each of the lands 38 before discharging to the atmosphere. The loading pressures established at outlet ports 39 will therefore depend upon the position of the valve member 35 and accordingly upon the magnitude of the controlled condition.

As the movable valve member 35 is positioned upwardly the pressure established at the upper outlet port increases, whereas, that established at the lower decreases. By this arrangement it is possible to establish a loading pressure varying either directly or inversely with the magnitude of the controlled condition. In practice it is customary to insert a suitable plug in the port not in use. For example, the control system illustrated in Fig. 1 is arranged to establish a loading pressure varying inversely with the controlled condition. Therefore connection from the pilot valve 36 is made to the lower outlet port and a suitable plug inserted in the upper outlet port.

The loading pressure established by the pilot valve 36 in accordance with the value of the controlled condition is conducted through a pipe 41 to a loading pressure chamber 42 of a standardizing relay 43 of the type forming the subject matter of an application of Harvard H. Gorrie, Serial Number 8,047, filed in the United States Patent Office February 25, 1935, now Patent No. 2,098,914. Loading pressures established in chamber 42 are balanced against pressures established in a relay chamber 44, through the agency of opposed diaphragms 45 and 46 operatively connected by movable member 47. Admission and discharge of pressure fluid from the chamber 44 is controlled by a valve member 48 operating a fluid supply valve 49 and an exhaust valve 50. The arrangement is such that upon an increase in loading pressure within the chamber 42, the member 47 moves downwardly, opening the fluid pressure supply valve 49 until the pressure within the chamber 44 is equal to or in desired proportion to that established in chamber 42 when the member 47 is restored to the neutral position. The pressure at which the member 47 is in the neutral position may be varied as desired through the agency of an adjustable spring 51.

A chamber 52 separated from the chamber 44 by the diaphragm 46 is connected to the chamber 44 through an adjustable throttling valve 53 and a pipe 53A. With this construction when the loading pressure within the chamber 42 deviates from that corresponding to the desired magnitude of the controlled condition an immediate proportional change in pressure will be effected in the relay chamber 44. Thereafter a slow change at a rate depending upon the adjustment of the valve 53 will be effected until the loading pressure within the chamber 42 is restored to the desired value, due to the regenerative or additive effect of the pressure within the chamber 52. Stability is therefore achieved as the initial response is proportional to the changes in the controlled condition, and precise control is achieved, that is, control maintaining the controlled condition at the exact desired value is achieved, as the response is continued until the desired value obtains.

Pressures established within the relay chamber 44 are transmitted through pipe 54 to an averaging relay 55, hereinafter more fully described, and are effective for producing proportional pressures with the pipe 28. Accordingly upon a deviation of the controlled condition from the desired value an immediate and proportionate variation in pressure will be produced in the pipe 28 effecting an immediate change in the quantity of oil within the coupling 1 to vary the speed of the output shaft 3. Thereafter until the controlled condition is restored to the desired value a continuing change in the speed of the output shaft 3 will be made through the additive or regenerative effect of the fluid pressure within the chamber 52 of the standardizing relay 43.

In the control system shown in Fig. 1 a chamber 56 of the standardizing relay 43, separated from chamber 42 by the diaphragm 45, is open to the atmosphere through a pipe 57. In the control of some apparatus, however, it may be desirable to effect control in accordance with a plurality of conditions, or in accordance with one condition as modified by another. In such cases a loading pressure may be established proportional to the second or modifying condition, and transmitted to the chamber 56 by suitable means. Pressures established in the relay chamber 44 will then vary in functional relation to the plurality of conditions. Likewise the bleed valve 53 is shown adjustable so that the rate of the continuing effect may be made in accordance with the inherent lag, or rate of response of the coupling and power utilizing device upon the controlled condition.

Pressures established in the relay chamber 44 are transmitted through the pipe 54 to a chamber 58 of the averaging relay 55 of the type forming the subject matter of an application of Paul S. Dickey, Serial Number 8023, filed in the United States Patent Office February 25, 1935. Pressures in the chamber 58 are balanced against pressures established in the chamber 59 through the agency of opposed diaphragms 60 and 61 operatively connected by a movable member 62. The pressures thus established are transmitted through the pipe 28 to the diaphragm motors 26 and 27.

So that the speed of the variable output shaft 3 of the coupling 1 will be brought exactly to that desired without overtravel and hunting, I may through the agency of the averaging relay 55 produce fluid pressures in the pipe 28 proportional to the difference between the desired speed and actual speed. I accomplish this by producing through a suitable speed responsive device a pressure in chamber 63 proportional to the speed of the output shaft 3. Accordingly the difference in pressures within the chambers 58 and 63 will be effective against the pressure established in the chamber 59, so that pressure transmitted through the pipe 28 to the diaphragm motors 26 and 27 will be proportional to the difference between desired and actual speed. As the latter approaches the former the diaphragm valves 24 and 25 are gradually brought to the neutral position when the flow through the valve 24 into the pipe 29 is equal to the flow therefrom through the valve 25. The averaging relay 55 is provided with an adjustable spring 64 which may be adjusted so that when the pressure established by the standardizing relay 43 is equal to or in correct proportion to the pressure established by the speed responsive device the pressures relayed to the diaphragm motors 26 and 27 maintain them in the neutral position.

To produce a fluid pressure proportional to the speed of the output shaft 3 and accordingly proportional to the rate of output of the power utilizing device, I may, as shown in Fig. 1, employ a device forming the subject matter of an application of Paul S. Dickey entitled "Measuring and control systems," Serial Number 27,426, filed in the United States Patent Office on even date herewith. In accordance therewith I provide a fluid compressor 65 driven through suitable belt means 66 from the variable speed output shaft 3. Connected in the discharge line 67 is a receiver 68 provided with a fixed orifice 69, of such size that the pressure of the atmosphere into which the orifice 69 discharges is below the critical pressure for the pressure within the discharge line 67. Inasmuch as the volume of fluid compressed varies directly with the speed of the compressor it follows from Napier's law that the pressure in the discharge line 67 will likewise be proportional to speed. Accordingly the pipe 70 connecting the chamber 63 to the receiver 68, will transmit to the former pressures proportional to the speed of the variable output shaft 3.

In Fig. 5 is shown another form of apparatus for producing a fluid pressure proportional to the speed of the output shaft 3. As the quantity of oil in the entire system is fixed it follows that the level of oil in the reservoir 17 will vary directly in accordance with the speed of the output shaft 3, and in place of using the speed responsive device shown in Fig. 1 I may produce a fluid pressure responsive to changes in oil level in the reservoir 17, and accordingly responsive to changes in speed of the output shaft 3.

Referring to Fig. 5 I show a float 71 supporting a rack 72 meshing with a suitable pinion 73 operatively connected to a cam 74. Vertical displacement of the float 71 produces a proportionate angular displacement of the cam 74, which through a cam follower 75 positions the movable valve member 35A of a pilot valve 36A, having a fluid pressure inlet pipe 40A and an outlet pipe 70. The arrangement is such that upon the level of oil in the reservoir 17 rising, indicating a decrease of speed of the variable output shaft 3, the pressure at the outlet port of the pilot valve 36A and within the pipe 70 decreases proportionately, and conversely, upon a decrease in oil level within the reservoir 17 the pressure within the pipe 70 increases. As a functional relation exists between oil level in the reservoir 17 and the speed of the output shaft 3, the cam 74 may be shaped, if desired, so that variations in pressure established within the pipe 70 are directly proportional to variations in speed of the output shaft 3 rather than to variations in oil level within the reservoir 17.

In Fig. 6 I have shown another form of apparatus for producing a fluid pressure proportional to the speed of the output shaft 3. As hereinbefore stated a pressure is developed in the scoop tube 11 which bears a functional relation to the speed of the runner 5. Accordingly a pressure sensitive device such as an expansible-contractible bellows 76 may be connected to the discharge pipe 13 and arranged to actuate the valve stem 35B of a pilot valve 36B to produce a loading pressure in the pipe 70 and chamber 63 proportional to the speed of the output shaft 3.

In Fig. 2 the valves 24 and 25 are shown both connected into the pipe 13 transmitting oil from the outlet passage 12 of the coupling 1 to the cooler 14. To maintain a definite pressure at the inlet to the valve 25 a pressure relief valve 22A is interposed in the pipe 13 between the connections to the valves 24 and 25.

A continuous circulation of oil may be maintained from the pump 18 through a by-pass line 21A in which is disposed a pressure relief valve 22B, to the pump inlet through the return line 78. The valves 24 and 25 may function as described with reference to Fig. 1. Accordingly when the speed of the output shaft 3 is at the desired value a relatively small amount of oil will be discharged through the valve 24 into the line 13, and an equal amount discharged from the line 13 through the valve 25 to the return line 78. When the fluid pressure in line 28 increases, indicating that the speed of the output shaft 3 should be increased, the valve 24 will be positioned in an opening direction, and the valve 25 in a closing direction discharging oil into the line 13 more rapidly than it is discharged therefrom, thereby increasing the quantity of oil in the coupling and effecting an increase in speed of the output shaft 3. When the fluid pressure in the pipe 28 decreases, indicating that the speed of the output shaft 3 should be decreased, the valve 25 will be positioned in an opening direction and the valve 24 in a closing direction, thus discharging oil from the pipe 13 more rapidly than it is received, thereby effecting a decrease in the speed of the output shaft 3.

I may desire to arrange the valves 24 and 25 so that they are in closed position when the speed of the output shaft 3 is at the desired value, and position one or the other in an opening direction, depending upon whether it is desired to decrease or increase the speed, as explained with reference to Fig. 1.

In Fig. 3 I show a further modification wherein the valve 24 is arranged to discharge oil into the inlet pipe 15 and the valve 25 arranged to discharge oil from the outlet pipe 13. The valves 24 and 25 may be arranged so that when the speed of the output shaft 3 is at the desired value an equal flow of oil is maintained, or they may be arranged so that both are in the closed position and one or the other open, depending upon whether it is desired to increase or decrease the speed of the output shaft 3.

In Fig. 4 the quantity of oil in the coupling 1 is varied by controlling the operation of the pump 18, which is driven by a start-stop-reversing motor 79, and connected by pipe 80 to the inlet pipe 15. When the speed of the output shaft 3 is at the desired value, the pump 18 remains stationary. When it is desired to increase the speed, the pump 18 is driven so as to discharge oil from the reservoir 17 into the pipe 80; and when it is desired to withdraw oil from the coupling 1 the pump 18 is driven in the reverse direction so as to discharge oil from the pipe 80 to the reservoir 17.

The operation of the motor 79 may be controlled to maintain a condition at a desired value, as illustrated in Fig. 1 by having the pipe 54 from the standardizing relay 43 connected to the diaphragm 81 of a differential pressure switch 82, and the pipe 70 from the receiver 68 connected to the opposed diaphragm 83. When, for example, the fluid pressure within the pipe 54 increases, indicating that the speed of the output shaft 3 should be increased, movable contact arm 84 of the switch 82 will move upward as viewed in the drawings, engaging the contact 85 energizing the motor 79 in a direction to discharge oil from the reservoir 17 into the pipe 80.

When the pressure in the pipe 54 decreases, indicating that the speed of the output shaft 3 should be decreased, the movable switch member 84 will move downward engaging the contact 86, energizing the motor 79 in a direction to discharge oil from the pipe 80 into the reservoir 17.

The movable switch member 84 is shown connected to a source 87 through a suitable intermittent switch mechanism 88, periodically actuated by a motor 89. Accordingly operation of the motor 79 will be intermittent and oil will be discharged from and admitted to the coupling in increments. Such operation permits the speed of the output shaft 3 to become stabilized for the incremental change in oil volume before a further change is made, effectually preventing over-travel or hunting.

Figure 7:
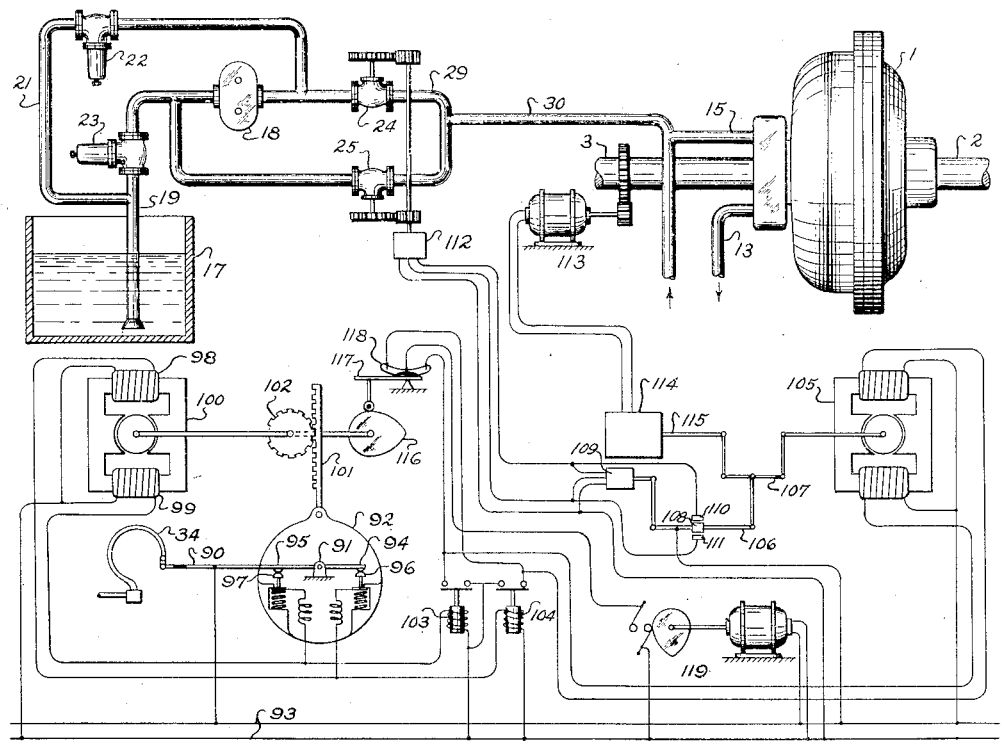
Fig. 7 shows diagrammatically an electrically-actuated coupling control.

In Fig. 7 is shown a control circuit in general operation similar to that of Fig. 1, but modified in that control of the valves 24 and 25 is effected through electrical means. The system contemplates positioning the valves 24 and 25 by primary electrical impulses in sense dependent upon and in time duration proportional to changes in the controlled condition; and by secondary periodic electrical impulses of constant time duration and in sense according to the direction of the deviation of the controlled condition from the desired value. Upon a change in magnitude of the controlled condition, the primary impulses act to vary the rate of output of the driven device to prevent a further change in the controlled condition; and the secondary impulses act to vary the rate of output of the driven device to restore the controlled condition to the desired value.

Referring to Fig. 7, I show the Bourdon tube 34 adapted to position a beam 90 about a fulcrum 91 supported in a vertically movable carriage 92. The beam 90 is connected to a suitable source 93 and carries contacts 94 and 95 disposed on either side of the fulcrum 91, and normally in engagement with contacts 96 and 97 respectively which are connected to opposed fields 98 and 99 of a reversible motor 100. The carriage 92 is supported by a rack 101 in engagement with a pinion 102 operatively connected to the motor 100.

When the Bourdon tube 34 is in a position corresponding to the desired value of the controlled condition the fields 98 and 99 are equally energized. Upon counterclockwise positioning of the Bourdon tube 34 the contact 95 disengages the contact 97, deenergizing the field 99, permitting rotation of the motor 100 in a direction to effect an upward positioning of the carriage 92, which will continue until the contact 95 again engages the contact 97. Conversely when the Bourdon tube 34 is positioned in a clockwise direction, the contact 94 will disengage the contact 96 deenergizing the field 98 and effecting a downward positioning of the carriage 92, which will continue until the contact 94 again engages the contact 96.

Similarly controlled by the beam 90 through relays 103 and 104 is a motor 105 arranged to position one end of a floating beam 106 through a horizontal differential link 107. The opposite end of the beam 106 is positioned by a reversible follow-up motor 109. The beam 106 is connected to the source 93 and carries a contact 108 adapted to engage stationary contacts 110 and 111 which are connected to a reversible motor 112 actuating the valves 24 and 25 and to the follow-up motor 109. So long as the contact 108 is in the position shown in Fig. 7 contacts 110 and 111 are disengaged therefrom and motors 112 and 109 are deenergized. When, however, the beam 106 is positioned in a counterclockwise direction about its left end as a center, the contact 108 will engage the contact 110 operating the motor 112 in a direction to open the valve 25 and close the valve 24. Simultaneously the follow-up motor 109 will operate in a direction to position the beam 106 in a counterclockwise direction about its right end as a center. When the movement of the motors 109 and 112 have been proportional to the movement of the motor 105 contact 108 will be restored to the neutral position engaging neither contact 110 and contact 111. Conversely, upon the beam 106 being positioned in a clockwise direction about its left end as a center, contact 108 will engage contact 111 effecting operation of motors 112 and 109, and when the clockwise movement of the left end of beam 106 is proportional to the initial movement of the right end contact 108 will be restored to the neutral position.

Driven by the output shaft 3 is a tachometer generator 113 connected to an indicator 114 adapted to position an arm 115 pivotally connected to the differential link 107. The displacement of the arm 115 from an initial position is proportional to the speed of the output shaft 3.

In operation, assuming for example that the Bourdon tube 34 positioned in a clockwise direction, indicating that the speed of the output shaft 3 should be increased, the motor 105 will be energized for a period of time proportional to the amount of displacement of the Bourdon tube 34 and in a direction effecting engagement of the contact 108 with the contact 111. Engagement of these contacts will effect an opening of the valve 24 and a closure of the valve 25, increasing the quantity of oil in the coupling 1, thus increasing the speed of the output shaft 3.

The motor 109 will move in proportion to the motor 112, positioning the left end of beam 106 upwardly, and when the movement of valves 24 and 25 is in proportion to the movement of motor 105 contact 108 will be restored to the neutral position.

As the valve 24 opens and the valve 25 closes the speed of the output shaft 3 will increase and the tachometer arm 115 will be positioned upwardly positioning the beam 106 in a counterclockwise direction about its left end as a center. The contact 108 will engage the contact 110, operating the motor 112 in a direction to position the valve 24 in a closing direction and the valve 25 in an opening direction, thereby decreasing the rate at which fluid is introduced into the coupling circuit. The arm 115 will continue to be positioned in a counterclockwise, or upward, direction so long as the speed of the shaft 3 increases. As, however, the valves 24 and 25 reach the neutral position the rate of increase in speed will continuously decrease.

As evidenced from the linkage arrangement shown in Fig. 7, when the increase in speed of the output shaft 3 is proportional to the movement of motor 105 and accordingly proportional to the change in pressure effective within the Bourdon tube 34 the beam 106 will be restored to the horizontal position as shown. It is further apparent that for each pressure within the Bourdon tube 34 there will be a predetermined definite output speed of the shaft 3, and that due to the operation of the valves 24 and 25 the approach to the desired speed will be made asymptoticly so that hunting or overshooting will not occur.

So that the speed of the output shaft 3 will continue to change until the controlled condition is restored to the desired value, I may provide means for periodically altering by increments the quantity of oil in the coupling 1 until the condition is restored to the desired value. As shown, positioned by the motor 100, is a cam 116 positioning a fulcrumed cam follower 117 carrying a double ended mercury switch 118 periodically for constant increments of time connected to the source 93 through an interrupter mechanism 119.

When the controlled condition is at the desired value as indicated by the vertical position of the carriage 92, the mercury switch 118 is open circuited. Upon the carriage moving upwardly, for example, indicating an increase in the magnitude of the controlled condition above the desired value, the mercury switch 118 will be tilted in a direction to effect periodic energization of the motor 105 in proper sense to cause a proportionate decrease in the speed of the output shaft 3. Such periodic energization will continue until the controlled condition is restored to the desired value, as indicated by the carriage 92 returning to the original position, when the mercury switch 118 will be open circuited until an additional deviation of the controlled condition from the desired value occurs. Upon a decrease in the value of the controlled condition below the desired value the mercury switch 118 will be tilted in opposite direction effecting periodic increases in speed of the output shaft 3 until the controlled condition is restored to the desired value.

The operation of the mercury switch 118 therefore superimposes upon the positioning control effected through the relative action of the beam 90, and carriage 92, a floating control depending solely upon the sense of departure of the controlled condition from the desired value, and continuing until the controlled condition is restored to the desired value.

Figure 8:
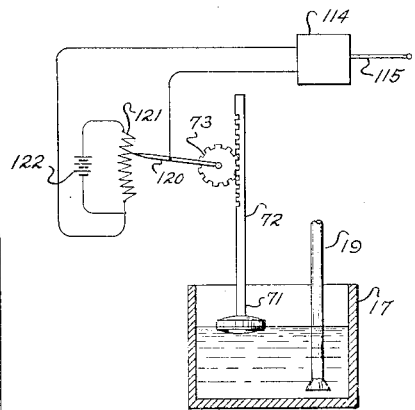

In Fig. 8 is illustrated a means for obtaining a potential proportional to the level of oil in the reservoir 17 which may be used to actuate the indicator 114 in place of the tachometer generator 113. In this modification the float 71 through the pinion 73 positions a contact arm 120 relative to a stationary slide wire resistance 121 energized by suitable source of potential 122. The indicator 114 is connected at a suitable point to the potentiometer, formed by the source of potential 122 and slide wire resistance 121; and to the contact arm 120. As the level of oil in the reservoir 17 falls, indicating an increase in speed of the coupling 1, the contact arm 120 moves upward, increasing the potential effective on the indicator 114 and effecting a downward positioning of the arm 115.

Figure 9:
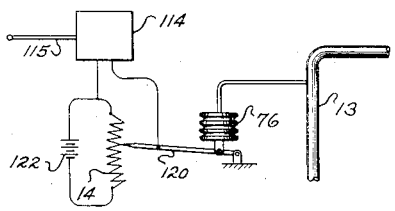
Figs. 8 and 9 show modified forms of follow-up devices which may be used with the coupling control illustrated in Fig. 7.

In Fig. 9 I have shown a further modification whereby a potential is produced for positioning the arm 115 in accordance with the oil pressure in the outlet pipe 13. Therein the pressure responsive bellows 76 is adapted to position the contact arm 120 relative to the slide wire resistance 121. The arrangement is such that as the pressure within the bellows 76 increases the arm 120 is positioned downwardly, thereby increasing the potential effective on the indicator 114, and effecting a downward positioning of the arm 115.

It will be understood that by describing and illustrating certain preferred embodiments of my invention I am not to be limited thereby except as to the appended claims in view of the prior art.

What I claim as new, and desire to secure by Letters Patent of the United States, is:

1. In combination with a hydraulic coupling having an input and an output shaft and containing a volume of fluid, means to vary the volume of fluid to produce a desired coupling output, comprising a movable member having a neutral position, means for producing a first fluid pressure in accordance with the rate of displacement and the amount of displacement of said member from the neutral position, means for producing a second fluid pressure in accordance with the speed of the output shaft of the hydraulic coupling, means for producing a third fluid pressure in accordance with the difference between the first and second fluid pressures, and means for regulating the volume of fluid in the hydraulic coupling in accordance with the third fluid pressure.

2. In combination with a hydraulic coupling having a fluid circulating system containing a volume of fluid, means to vary the volume of fluid to produce a desired coupling output comprising a movable member having a neutral position, means for producing a first fluid pressure in accordance with the rate of displacement and the amount of displacement of said member from the neutral position, means for producing a second fluid pressure in accordance with the pressure of the fluid at a point in said circulating system, means for producing a third fluid pressure in accordance with the difference between the first and second fluid pressures, and means for regulating the volume of fluid in the circulating system in accordance with the third fluid pressure.

3. In combination with the hydraulic coupling having a fluid reservoir and a fluid circulating system containing a fixed volume of fluid, means for regulating the relative proportion of fluid in the reservoir and coupling to produce a desired output comprising a movable member having a neutral position, means for producing a first fluid pressure in accordance with the rate of displacement and the amount of displacement of said member from the neutral position, means for producing a second fluid pressure in accordance with the amount of fluid in the reservoir, means for producing a third fluid pressure in accordance with the difference between the first and second fluid pressures, and means for varying the relative proportion of fluid in said reservoir and coupling in accordance with the third fluid pressure.

4. In a control system for a hydraulic coupling, in combination, a fluid pressure circuit connected to the hydraulic coupling, electromagnetic valve means in said circuit for regulating the flow of pressure fluid to and from said coupling, and means controlling said valve means comprising a first electric circuit, means responsive to the output speed of said coupling, a movable member having a neutral position, a second electric circuit, means under the control of said movable member for energizing said second circuit for increments of time proportional to movements of said member, means for periodically energizing said circuit when said member is displaced from the neutral position, motor means connected in said circuit, and means controlling said first electric circuit under the joint control of said motor means and said speed responsive means.

5. In a control system for a hydraulic coupling, in combination, a fluid circuit, means for maintaining a flow of fluid through said circuit, a connection between said circuit and said coupling, a flow controlling valve on either side of said connection, means for maintaining equal and constant pressure drops across said valves, fluid pressure responsive motors for actuating said valves, one of said valves positioned in a closing direction and the other of said valves positioned in an opening direction upon an increase in fluid pressure.

6. In a control system for a hydraulic coupling, in combination, a fluid circuit, means for maintaining a flow of fluid through said circuit, a connection between said circuit and said coupling, a valve connected in said circuit on one side of said connection, an oppositely acting valve on the other side of said connection, regulating means for said valve means, and means for maintaining a constant and equal pressure drop across said valves.

7. In a control system for a hydraulic coupling having a fluid flow circuit, in combination, oppositely acting valve means for regulating the flow of fluid to and from said circuit, means for producing a first fluid pressure proportional to the output speed of said coupling, a movable member having a neutral position, means for producing a second fluid pressure in accordance with the displacement of said member from the neutral position, means for producing a third fluid pressure in accordance with the difference between said first and second fluid pressures, and motor means for actuating said valve means responsive to said third fluid pressure.

8. In a control system for a hydraulic coupling having a fluid inlet, in combination, a fluid circuit, means for maintaining a flow of fluid through said circuit, a connection between said circuit and the coupling inlet, a flow controlling valve on either side of said connection, means for maintaining equal and constant pressure drops across said valves, fluid pressure responsive motors for actuating said valves, the valve on the upstream side of said connection positioned in an opening direction, and the other of said valves positioned in a closing direction upon an increase in fluid pressure.

9. In combination with a hydraulic coupling having an input and an output shaft and containing a volume of fluid, means to vary the volume of fluid to produce a desired coupling output comprising a movable member, means for producing a first fluid pressure in accordance with the position of said member, means for producing a second fluid pressure in accordance with the speed of the output shaft of the hydraulic coupling, means for producing a third fluid pressure in accordance with the difference between the first and second fluid pressures, and means for regulating the volume of fluid in the hydraulic coupling in accordance with the third fluid pressure.

10. In combination with a hydraulic coupling having an input and an output shaft and containing a volume of fluid, means to vary the volume of fluid to produce a desired coupling output comprising a movable member, means for producing a first fluid pressure in accordance with the position of said member, means for producing a second fluid pressure in accordance with the coupling output, means for producing a third fluid pressure in accordance with the difference between the first and second fluid pressures, and means for regulating the volume of fluid in the hydraulic coupling in accordance with the third fluid pressure.

11. In combination with a hydraulic coupling having a fluid circulating system containing a volume of fluid, means to vary the volume of fluid to produce a desired coupling output comprising a movable member, means for producing a first fluid pressure in accordance with the position of said member, means for producing a second fluid pressure in accordance with the pressure of the fluid at a point in said circulating system, means for producing a third fluid pressure in accordance with the difference between the first and second fluid pressures, and means for regulating the volume of fluid in the circulating system in accordance with the third fluid pressure.

12. In combination with a hydraulic coupling having a fluid reservoir and a fluid circulating system containing a fixed volume of fluid, means for regulating the relative proportion of fluid in the reservoir and coupling to produce a desired output comprising a movable member, means for producing a first fluid pressure in accordance with the position of said member, means for producing a second fluid pressure in accordance with the amount of fluid in the reservoir, means for producing a third fluid pressure in accordance with the difference between the first and second fluid pressure, and means for varying the relative proportion of fluid in said reservoir and coupling in accordance with the third fluid pressure.

13. In a control system for a hydraulic coupling, in combination, a fluid pressure circuit connected to the hydraulic coupling, electromagnetic valve means in said circuit for regulating the flow of pressure fluid to and from said coupling, and means controlling said valve means comprising a first electric circuit, means responsive to the rate of coupling output, a movable member, a second electric circuit, means under the control of said movable member for energizing said second circuit, motor means connected in said second circuit, and means controlling said first circuit under the joint control of said motor means and said means responsive to the rate of coupling output.

14. In a control system for a hydraulic coupling, in combination, a fluid pressure circuit connected to the hydraulic coupling, electromagnetic valve means in said circuit for regulating the flow of pressure fluid to and from said coupling, means controlling said valve means comprising a movable member having a neutral position, means under the control of said movable member for energizing said valve means for increments of time proportional to the movements of said member, and means for periodically energizing said valve means when said member is displaced from the neutral position.

15. In a control system for a hydraulic coupling, in combination, a fluid circuit, means for maintaining a flow of fluid through said circuit, a connection between said circuit and said coupling, a flow controlling valve on either side of said connection, fluid pressure responsive motors for actuating said valves, one of said valves positioned in a closing direction and the other of said valves positioned in an opening direction upon an increase in fluid pressure.

16. In a control system for a hydraulic coupling, in combination, a fluid circuit, means for maintaining a flow of fluid through said circuit, a connection between said circuit and the inlet of said coupling, a flow controlling valve on either side of said connection, a first movable member, a second member movable in accordance with the coupling output, and means under the joint control of said members for simultaneously operating said valves.

17. In a control system for a hydraulic coupling, in combination, a fluid circuit, means for maintaining a flow of fluid through said circuit, a single connection between said circuit and said coupling, a flow controlling valve on either side of said connection, a first movable member, a second member movable in accordance with the coupling output, and means under the joint control of said member for simultaneously operating said valve.

18. In combination, a hydraulic coupling having an inlet and an outlet, a separate circuit through which a fluid is adapted to circulate, a connection between said inlet and said circuit; and means for varying the pressure of the fluid through the portion of said circuit which includes said connection above and below that existing at the inlet to the coupling to regulate the flow of pressure fluid to and from the coupling.

19. In combination, a hydraulic coupling having an inlet and an outlet, a separate circuit through which a fluid is adapted to circulate, a single connection between a portion of said circuit and said inlet, means for increasing the pressure through said portion of the circuit above that existing at the inlet and for decreasing the pressure in the said portion below the pressure at the inlet whereby fluid is admitted to or withdrawn from the coupling.

20. In a control system for a hydraulic coupling, in combination, a fluid pressure circuit comprising a pump and a connection from the discharge of the pump to the inlet thereof, a branch connection from said first named connection to the hydraulic coupling, electromagnetic valve means for regulating the pressure of the fluid in the first named connection at either side of said branch connection to regulate the flow of fluid from the circuit to the coupling and vice versa, a circuit for said electromagnetic valve means, means responsive to an indication of the output of said coupling, means responsive to movements of a movable member, and circuit controlling means under the joint control of said last two named means.

21. In a control system for a hydraulic coupling having a working fluid circuit, in combination, a second fluid circuit separate from said working fluid circuit comprising a pump and a conduit between the discharge and inlet of the pump, a connection between the first and second named circuits, valve means disposed in said second named circuit for controlling the flow of fluid to and from said working circuit, and pressure fluid motor means for operating said valve means.

22. In a control system for a hydraulic coupling having a working fluid circuit, in combination, a second fluid circuit separate from said working fluid circuit comprising a pump and a conduit between the discharge and inlet of the pump, a connection between the first and second named circuits, and valve means disposed in said second named circuit for controlling the flow of fluid to and from said working circuit.

23. In combination with a hydraulic coupling having an input and an output shaft and containing a volume of fluid, means to vary the volume of fluid to produce a desired coupling output comprising means for producing a first control force proportional to the coupling output, a movable member, means for producing a second control force in accordance with the position of said member, means for producing a fluid pressure proportional to the difference between the first and second control forces, and means for regulating the volume of fluid in the hydraulic coupling under the control of said fluid pressure whereby a predetermined difference between the first and second control forces is maintained.

24. In combination with a hydraulic coupling having an input and an output shaft and containing a volume of fluid, means to vary the volume of fluid to produce a desired coupling output comprising a movable member, means for producing a first fluid pressure in accordance with the position of said member, a second movable member, means for applying a first control force to said second member proportional to the coupling output and tending to move said member in one direction, means for applying a second control force to said member proportional to said first fluid pressure and tending to move said second member in opposite direction, means actuated by said second member to produce a second fluid pressure proportional to the difference between the first and second control forces, and means for regulating the volume of fluid in the hydraulic coupling under the control of the second fluid pressure whereby a predetermined difference between said first and second control forces is maintained.

HARRY E. WEAVER.